United States Patent
Rai et al.

(10) Patent No.: US 8,467,365 B1
(45) Date of Patent: Jun. 18, 2013

(54) METHOD AND SYSTEM FOR DEFINING SEARCH WINDOWS BASED ON MOBILE STATION LOCATION

(75) Inventors: Deveshkumar Rai, Overland Park, KS (US); Manoj Shetty, Overland Park, KS (US); Sachin R. Vargantwar, Overland Park, KS (US); Siddharth S. Oroskar, Overland Park, KS (US); Debashish Sarkar, Irvine, CA (US)

(73) Assignee: Sprint Spectrum L.P., Overland Park, KS (US)

( * ) Notice: Subject to any disclaimer, the term of this patent is extended or adjusted under 35 U.S.C. 154(b) by 1017 days.

(21) Appl. No.: 12/019,374

(22) Filed: Jan. 24, 2008

(51) Int. Cl.
*H04B 7/216* (2006.01)

(52) U.S. Cl.
USPC ........... 370/342; 370/324; 370/350; 370/503; 370/338; 370/332; 455/422.1; 455/420; 455/502; 455/456.5; 455/456.6

(58) Field of Classification Search
USPC ................. 455/436, 437, 440, 456, 446, 448, 455/439, 67.11, 422.1, 434, 525, 502; 370/320, 370/310, 328–329, 331–332, 335, 342, 491, 370/500, 324, 319, 338, 344, 350, 203, 380, 370/252, 479; 375/141, 145, 149, 150, 347, 375/349
See application file for complete search history.

(56) References Cited

U.S. PATENT DOCUMENTS

| | | | |
|---|---|---|---|
| 5,577,022 A | 11/1996 | Padovani et al. | |
| 6,188,354 B1 | 2/2001 | Soliman et al. | |
| 6,204,812 B1 | 3/2001 | Fattouche | |
| 6,321,090 B1 | 11/2001 | Soliman | |
| 6,542,743 B1 * | 4/2003 | Soliman | 455/436 |
| 6,549,545 B1 | 4/2003 | Yamamoto et al. | |
| 6,564,057 B1 * | 5/2003 | Chun et al. | 455/437 |
| 6,580,749 B1 | 6/2003 | Miura | |
| 6,775,252 B1 * | 8/2004 | Bayley | 370/328 |
| 7,020,180 B2 | 3/2006 | Challa et al. | |
| 7,236,796 B2 | 6/2007 | Soliman | |
| 7,391,759 B2 | 6/2008 | Wallace et al. | |
| 2001/0006514 A1 | 7/2001 | Park | |
| 2003/0214436 A1 | 11/2003 | Voor et al. | |
| 2004/0131032 A1 | 7/2004 | Sendonaris et al. | |
| 2004/0233874 A1 | 11/2004 | Baker | |
| 2005/0020264 A1 | 1/2005 | Akao et al. | |
| 2009/0125630 A1 | 5/2009 | Gogic | |

FOREIGN PATENT DOCUMENTS

EP 1107483 A1 6/2001

* cited by examiner

*Primary Examiner* — Vladimir Magloire
*Assistant Examiner* — Babar Sarwar

(57) ABSTRACT

A mobile station uses a search window to search for a target pilot signal transmitted by a target transmitter in a spread spectrum communication system. The search window may be centered on the expected phase of the target pilot signal at the mobile station. To calculate the expected phase, the mobile station estimates a transmission delay associated with the target pilot signal, based on at least the target transmitter's location and the mobile station's location. The transmission delay may account for the time it takes for the target pilot signal to propagate from the target transmitter to the mobile station. The expected phase of the target pilot signal may then be calculated based on at least a nominal phase of the target pilot signal (e.g., the phase when transmitted by the target transmitter) and the estimated transmission delay.

14 Claims, 3 Drawing Sheets

METHOD AND SYSTEM FOR DEFINING SEARCH WINDOWS BASED ON MOBILE STATION LOCATION

BACKGROUND

Spread spectrum communications are commonly used in cellular networks that provide wireless service to mobile stations, such as wireless telephones. Such cellular networks typically operate in accordance with IS-95 CDMA or cdma2000 standards.

The signals transmitted by base stations in a spread spectrum communication system are spread by a pseudonoise (PN) sequence. For example, in accordance with IS-95 CDMA standards, the pilot signal transmitted by a base station is spread by a "short" PN sequence at a chipping rate of 1.2288 MHz, and the "short" PN sequence repeats itself every 26.67 milliseconds. With this chipping rate, one "chip" is approximately 0.8138 microseconds.

Each pilot signal transmitted by a spread spectrum communication system may be spread by the same short PN sequence but with a different phase or "PN offset." In this regard, the beginning of a PN sequence used to spread a signal may occur at a particular time offset relative to a reference time, according to the time used by the spread spectrum communication system. The "PN offset" of the signal may then correspond to this particular time offset.

In accordance with IS-95 CDMA standards, each PN offset is defined by an index that is an integer in the range of 0 through 511. The actual PN offset is then found by multiplying its index by 64 chips. Thus, a PN offset of "0" means that the PN sequence begins at the reference time. A PN offset of "1" means that the PN sequence begins 64 chips after the reference time. A PN offset of "2" means that the PN sequence begins 128 chips after the reference time, etc. In this way, different pilot signals may be distinguished by their PN offsets.

As noted above, the PN offset of a pilot signal is defined with respect to a reference time according to the system's time. However, when the pilot signal is received by a mobile station, the mobile station may measure a different PN offset. The difference between the PN offset transmitted by a base station (the nominal PN offset) and the PN offset measured by the mobile station (the measured PN offset) can arise for at least two reasons: (1) there may be a transmission delay between when the pilot signal is transmitted by the base station and when it is received by the mobile station; and (2) the mobile station's time may not be perfectly synchronized to the system's time.

The transmission delay can be a function of the distance between the base station's antenna and the mobile station. For example, a pilot signal will travel approximately 244 meters in one chip (assuming that one chip is 0.8138 microseconds). Thus, it takes about 6.6 chips for a pilot signal to travel one mile. This means that if the mobile station is trying to detect a pilot signal from a target base station that is one mile away, the mobile station will measure a PN offset that is 6.6 chips greater than the nominal PN offset of the target base station's pilot signal (provided that the mobile station's time is perfectly synchronized with the system's time).

However, the mobile station's time may not be perfectly synchronized with the system's time. This is because the mobile station may attempt to synchronize its time with the system's time based on a synchronization signal transmitted by a source base station in the spread spectrum communication system, and there may be a transmission delay associated with this synchronization signal due to the distance between the source base station and the mobile station. The base station that is the source of the synchronization signal used by the mobile station is typically the base station that transmits the strongest pilot signal received by the mobile station. The transmission delay associated with the synchronization signal causes the mobile station's time to lag the system's time, thereby making the PN offsets of pilot signals received by the mobile station appear to be less than they would otherwise.

The net effect of the transmission delays will depend on how, $D_S$, the distance between the mobile station and the source base station (the source of the synchronization signal used by the mobile station), compares to $D_T$, the distance between the mobile station and the target base station (the base station that transmits the target pilot signal being sought by the mobile station). If $D_S$ is equal to $D_T$, then the measured PN offset of the target pilot signal may be equal to its nominal PN offset. If $D_S$ is less than $D_T$, then the measured PN offset of the target pilot signal may be greater than its nominal PN offset. If $D_S$ is greater than $D_T$, then the measured PN offset of the target pilot signal may be less than its nominal PN offset.

Because the PN offset of a pilot signal that is measured by a mobile station can be either greater than or less than the nominal PN offset of the pilot signal, a mobile station may use a search window centered on the nominal PN offset to search for the pilot signal. The search window typically has a width (in chips) that is specified by a width parameter that the mobile station receives from the spread spectrum communication system. In this way, the mobile station may find a target pilot signal so long as the target pilot signal's PN offset at the mobile station is within the range of PN offsets specified by the search window.

Overview

In a first principal aspect, an exemplary embodiment provides a method of searching for a target spread spectrum signal for a mobile station. The target spread spectrum signal has a nominal phase. In accordance with the method, a mobile station location of the mobile station is estimated. A target transmitter location of a target transmitter in a spread spectrum communication system is determined. The target transmitter transmits the target spread spectrum signal. A target-transmitter transmission delay is estimated based on at least the target transmitter location and the mobile station location. An expected phase of the target spread spectrum signal at the mobile station is calculated based on at least the nominal phase and the target-transmitter transmission delay. The mobile station searches for a spread spectrum signal having a phase at the mobile station that is within a predefined range of the expected phase.

In a second principal aspect, an exemplary embodiment provides a mobile station. The mobile station comprises a communication receiver for receiving spread spectrum signals, a processor, data storage, and a plurality of program instructions stored in the data storage. The program instructions are executable by the processor to perform the steps of: (a) estimating a target-transmitter transmission delay based on at least a target transmitter location of a target transmitter in a spread spectrum communication system and a mobile station location of the mobile station; (b) calculating an expected phase at the mobile station of a target spread spectrum signal transmitted by the target transmitter, wherein the expected phase is calculated based on at least (i) a nominal phase of the target spread spectrum signal and (ii) the target-transmitter transmission delay; and (c) controlling the communication receiver based on the expected phase.

DETAILED DESCRIPTION OF EXEMPLARY EMBODIMENTS

1. Introduction

Figure 1:
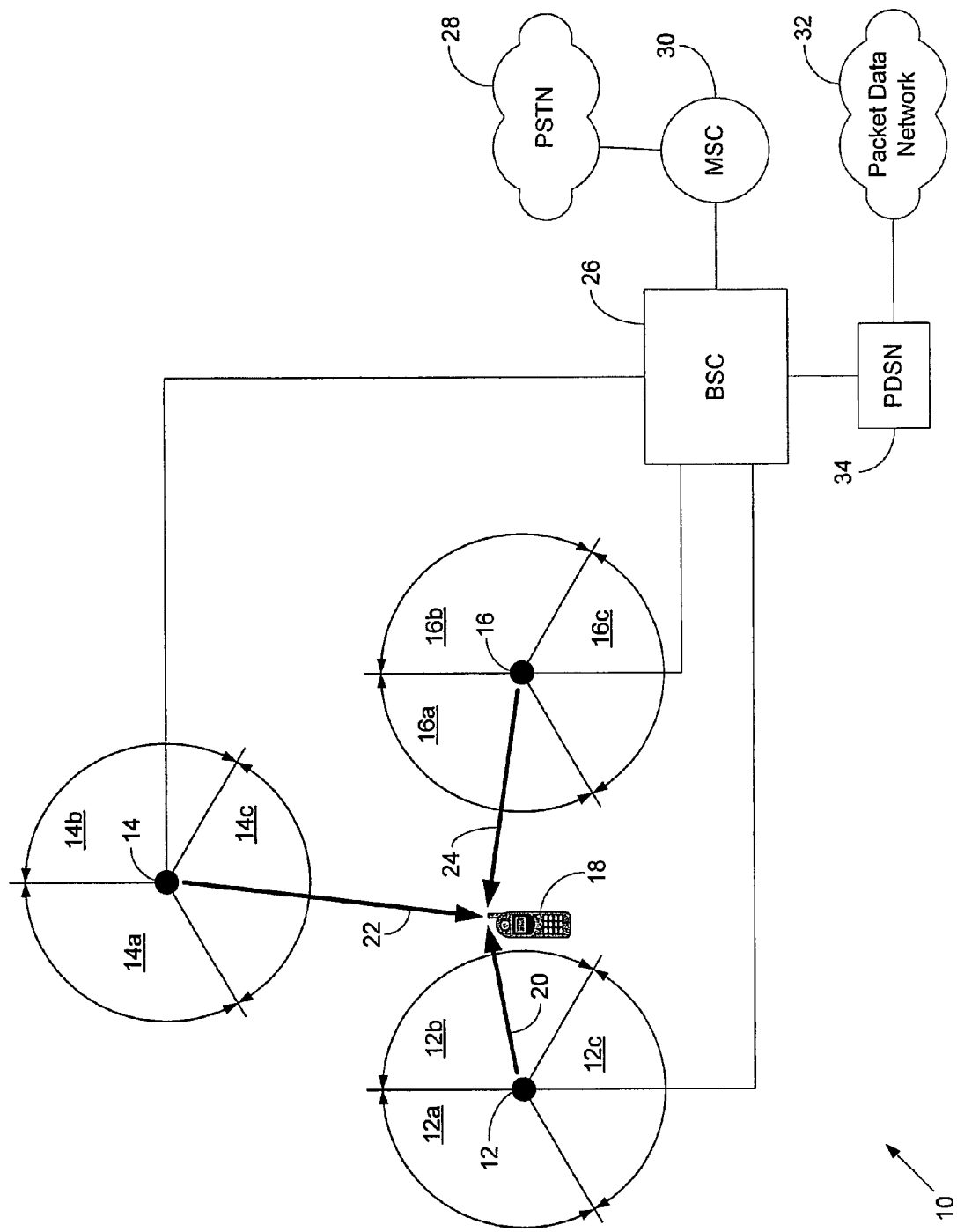
FIG. 1 is a block diagram of a spread spectrum communication system, in accordance with an exemplary embodiment.

The inventors have recognized that the use of search windows to search for pilot signals can cause inefficiencies. In particular, a mobile station may not be able to find a target pilot signal if its PN offset at the mobile station falls outside of the search window. This can occur, for example, when the transmission delay for the target pilot signal causes its PN offset at the mobile station to be very different from its nominal PN offset. This potential problem can be alleviated by making the search window wider. However, a wider search window also means that the mobile station may search through a greater number of phases before finding the target pilot signal. Thus, wider search windows can be undesirable because they can increase the time it takes the mobile station to find pilot signals.

To address these problems, the inventors propose the use of search windows that are based on the expected phases of pilot signals at the mobile station. To calculate a target pilot signal's expected phase, the mobile station may estimate a transmission delay for the target pilot signal and then calculate the expected phase as the target pilot signal's nominal phase increased by the transmission delay. The mobile station may estimate the transmission delay as the time it takes for the target pilot signal to propagate from the target base station (i.e., the base station transmitting the target pilot signal) to the mobile station. Thus, the mobile station may estimate the transmission delay based on the mobile station's location and the target base station's location. However, the mobile station may also take other factors into account when calculating the transmission delay (e.g., transmission delays that are internal to the target base station, transmission delays caused by repeaters, etc.).

In an exemplary approach, the mobile station obtains an estimate of its location by using the Global Positioning System (GPS) or some other positioning technology. The mobile station also obtains a location of the target base station, for example, by consulting a base station almanac. The mobile station calculates a transmission delay based on the distance between the mobile station's location and the target base station's location and calculates the expected phase of the target pilot signal as its nominal phase increased by the transmission delay. The mobile station then defines a search window that is centered on this expected phase. As a result, the mobile station may find the target pilot signal more efficiently.

The mobile station may also take into account a difference between its time and the system's time when calculating the expected phase of a target pilot signal. To do this, the mobile station may estimate the distance between its location and the location of the base station that transmitted the synchronization signal used by the mobile station to set its time, i.e., the source base station. The mobile station may then use this distance to calculate a transmission delay that represents a time difference between the mobile station's time and the system's time. In this way, the expected phase that the mobile station calculates may also take into account the transmission delay that corresponds to the distance between the mobile station and the source base station.

2. Exemplary Spread Spectrum Communication System

FIG. 1 illustrates an exemplary spread spectrum communication system 10 in which exemplary embodiments may be employed. System 10 includes a plurality of base transceiver stations (BTSs), exemplified in FIG. 1 by BTSs 12, 14, and 16. Each BTS may be able to wirelessly communicate with mobile stations, such as mobile station 18. Mobile station 18 could be a wireless telephone, wireless personal digital assistant, wireless e-mail device, wirelessly-equipped laptop computer, or other wireless communication device.

Each BTS may include a plurality of transmitters and a plurality of receivers (the transmitters and receivers may be integrated into transceivers) for wireless communication with mobile stations, such as mobile station 18. Moreover, each BTS may include directional antennas to define a plurality of sectors. For example, BTS 12 may define sectors 12a, 12b, and 12c, BTS 14 may define sectors 14a, 14b, and 14c, and BTS 16 may define sectors 16a, 16b, and 16c. Although FIG. 1 shows each BTS with three sectors, it is to be understood that a BTS may have a greater or fewer number of sectors. Moreover, it is to be understood that the illustration of sectors in FIG. 1 is schematic only and that FIG. 1 is not intended to illustrate the precise geographic area covered by any sector.

The wireless communication between a mobile station and a sector may occur via one or more forward link channels (for communications from a transmitter in the sector to the mobile station) and one or more reverse link channels (for communications from the mobile station to a receiver in the sector). In the case of IS-95 CDMA, the forward link channels may include a pilot channel, a sync channel, paging channels, and forward traffic channels, and the reverse link channels may include access channels and reverse traffic channels.

The signals in the forward link channels of a sector may each have a phase that is specific for that sector. That way, the mobile station can identify signals from different sectors based on phase. For example, mobile station 18 may receive a pilot signal 20 from a transmitter in BTS 12 associated with sector 12b, a pilot signal 22 from a transmitter in BTS 14 associated with sector 14c, and a pilot signal 24 from a transmitter in BTS 16 associated with sector 16a. Mobile station 18 may distinguish between pilot signals 20-24 based on their phases.

In the case of IS-95 CDMA, pilot signals 20-24 are each spread by the same "short" pseudonoise (PN) sequence, but the beginning of the PN sequence occurs at a different time offset for each of pilot signals 20-24. The time offset between the beginning of the PN sequence and a reference time, according to the "system time" used by system 10, defines the nominal phase of each pilot signal. The nominal phase may be identified as a PN offset index ranging from 0-511. In particular, the PN offset index may be used to determine the nominal phase by multiplying the PN offset index by 64 chips. However, the phases of pilot signals 20-24 at mobile station 18 will differ from their nominal phases due to transmission delays.

The transmission delay for a pilot signal may, in large part, be caused by the time it takes the pilot signal to propagate from the transmitter to the mobile station. Thus, pilot signal 20 may be associated with a transmission delay caused by the distance between BTS 12 and mobile station 18, pilot signal 22 may be associated with a transmission delay caused by the distance between BTS 14 and mobile station 18, and pilot signal 24 may be associated with a transmission delay caused by the distance between BTS 16 and mobile station 18. As described in more detail below, mobile station 18 may use these distances to estimate the transmission delays associated with pilot signals 20-24 and may use these transmission delays to calculated expected phases for one or more of pilot signals 20-24.

It is to be understood that mobile station 18 may receive pilot signals 20, 22, and 24 at different times. For example, pilot signal 20 may be the strongest pilot signal received by mobile station 18. In that case, mobile station 18 may acquire pilot signal 20 first, and mobile station 18 may use an associated synchronization signal (e.g., a sync channel signal transmitted by sector 12b) to set the time used by mobile station 18. Mobile station 18 may include pilot signal 20 of sector 12b in its "active set," indicating that mobile station 18 is monitoring one or more paging channels of sector 12b.

Mobile station 18 may then acquire pilot signal 24 as the next strongest pilot signal. Mobile station 18 may then add pilot signal 24 to its "candidate set," indicating that pilot signal 24 is a candidate for placement in the "active set."

Mobile station 18 may subsequently identify pilot signal 22 as a target pilot signal to search for. Pilot signal 22 may be identified in a neighbor list received by mobile station 18, in which case mobile station 18 may add pilot signal 22 to its "neighbor set" once pilot signal 22 is found. Alternatively, mobile station 18 may find pilot signal 22 by scanning through PN offsets sequentially, in which case mobile station 18 may add pilot signal 22 to its "remaining set" when found.

BTSs 12, 14, and 16 may be controlled by a base station controller (BSC) 26. For example, BSC 26 may control the use of forward and reverse traffic channels for wireless communication between BTSs 12, 14, and 16 and mobile stations, such as mobile station 18. BSC 26 may also control handoffs between the sectors in its service area (i.e., sectors 12a-c, 14a-c, and 16a-c).

BSC 26 may be communicatively coupled to a circuit-switched network, such as public switched telephone network 28, e.g., via a mobile switching center 30. BSC 26 may also be communicatively coupled to a packet-switched network, such as packet data network 32, e.g., via a packet data serving node (PDSN) 34. Mobile stations, such as mobile station 18, may engage in communication sessions with various endpoints via PSTN 28 or packet data network 32, in order to exchange voice, data, or other media. For example, a mobile station may engage in a voice call with an endpoint via PSTN 28. Alternatively, a mobile station may engage in a data session with an endpoint via packet data network 32, e.g., for voice-over-packet (VoP) communication, to send or receive e-mail, to browse the World Wide Web, to receive streaming video and/or audio, to participate in Internet gaming, or for other purposes.

For example, mobile station 18 may acquire pilot signal 20 associated with sector 12b and may include pilot signal 20 in its "active set." Thereafter, Mobile station 18 may use traffic channels associated with sector 12b for a voice call or other type of communication session. Mobile station 18 may also acquire pilot signal 24 associated with sector 16a and include pilot signal 24 in its "candidate set." In that case, mobile station 18 may subsequently use traffic channels associated with sector 16a for the communication session, for example, to effect a soft handoff. If mobile station 18 has also acquired pilot signal 22 associated with sector 14c, and has included pilot signal 22 in its "neighbor set" or "remaining set," then sector 14c may also be used for a handoff.

3. Exemplary Operation

Figure 2:
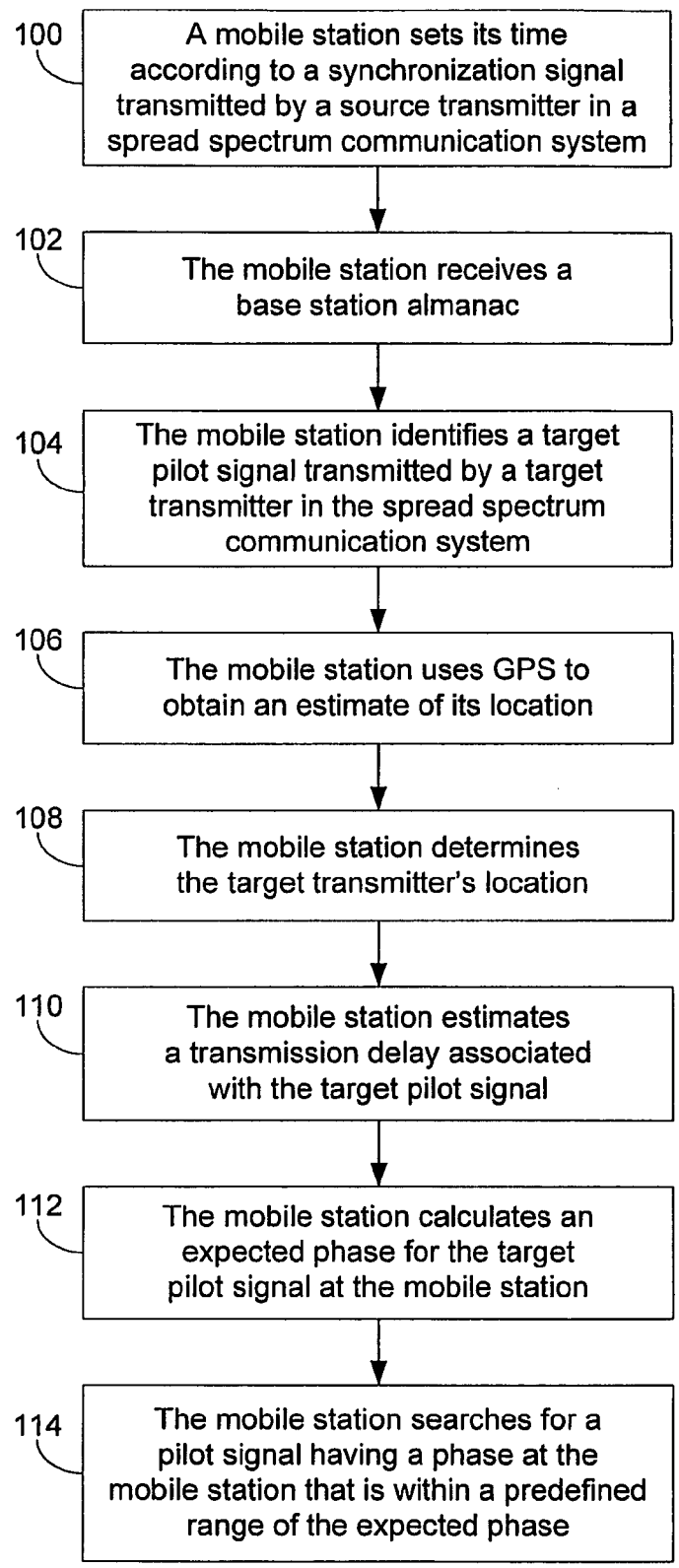
FIG. 2 is a flow chart illustrating a method of searching for a target spread spectrum signal, in accordance with an exemplary embodiment.

FIG. 2 is a flow chart illustrating an exemplary method of searching for a target spread spectrum signal transmitted by a target transmitter of a spread spectrum communication system (e.g., system 10 illustrated in FIG. 1) that is to be received by a mobile station. In this example, the target spread spectrum signal is a target pilot signal that has a nominal phase (e.g., a PN offset value) according to the system's time. However, to facilitate an efficient search for the target pilot signal, the mobile station calculates an expected phase of the target pilot signal at the mobile station, taking into account the time it takes for the target pilot signal to propagate from the target transmitter to the mobile station. y The method may begin when the mobile station (e.g., mobile station 18) sets its time according to a synchronization signal transmitted by a source transmitter in the spread spectrum communication system, as indicated by block 100. The source transmitter may be the transmitter that transmits the strongest pilot signal received by the mobile station. For example, the source transmitter may be the transmitter that transmits pilot signal 20 shown in FIG. 1. The synchronization signal provides information regarding a system time used by the spread spectrum communication system. Thus, in the case of IS-95 CDMA, the synchronization signal could be a sync channel signal. The mobile station then develops a mobile station time based on the synchronization signal. In this way, the mobile station may synchronize its time with the system time used by the spread spectrum communication system.

However, the synchronization is not necessarily perfect. The mobile station's time may differ from the system's time due to a transmission delay associated with the synchronization signal. The transmission delay may, in large part, correspond to the time it takes the synchronization signal to propagate from the source transmitter to the mobile station. In many cases, the mobile station may be sufficiently close to the source transmitter that this transmission delay can be neglected. Alternatively, the mobile station may take into account the transmission delay associated with the synchronization signal, as described in more detail below.

In this example, the mobile station also receives a base station almanac, as indicated by block 102. The base station almanac identifies the locations of transmitters in the spread spectrum communication system (or, more particularly, the locations of antennas used by the transmitters). The base station almanac may also include other information, such as the nominal PN offsets used by the transmitters. The mobile station may receive the base station almanac from a source transmitter or other transmitter in the spread spectrum communication system, either automatically or upon request by the mobile station.

At some point, the mobile station identifies a target pilot signal to search for, as indicated by block 104. The target pilot signal is transmitted by a target transmitter in the spread spectrum communication system. The mobile station may identify the target pilot signal in various ways. As one example, the mobile station may receive a neighbor list that identifies the target pilot signal (e.g., by its nominal PN offset) . As another example, the mobile station may identify the target pilot signal as the next in a sequence of PN offsets to search for. In this regard, the mobile station may search for pilot signals to add to its remaining set by searching for each $I^{th}$ nominal PN offset, where I is an increment parameter.

Thus, after searching for a pilot signal having a nominal PN offset of N, the mobile station may then search for a target pilot signal having a nominal PN offset of N+I. In yet other examples, the mobile station may identify target pilot signals in other ways, such as based on information contained in the base station almanac.

At some point, the mobile station obtains an estimate of its location, as indicated by block 106. The mobile station may obtain this location estimate either before or after the target pilot signal is identified (in block 104). The location estimate could be obtained by using a satellite-based positioning system, such as the Global Positioning System (GPS). Alternatively or additionally, other positioning technologies could be used, e.g., Advanced Forward Link Trilateration (AFLT) or hybrid techniques.

The mobile station also determines the target transmitter's location, as indicated by block 108. For example, the mobile station may consult the base station almanac to obtain the location of the antenna used by the target transmitter. However, the mobile station may determine the target transmitter's location in other ways.

The mobile station then estimates a transmission delay associated with the target pilot signal, as indicated by block 110. The mobile station may do this by estimating the distance between the mobile station's location and the target transmitter's location and then calculating the time it would take the target pilot signal to propagate this distance. Thus, the transmission delay could be taken as the propagation time. However, the mobile station may also take into account other factors that may contribute to the transmission delay. For example, the mobile station may take into account time offsets that are associated with specific base stations (which may be caused by internal transmission delays). Such base station specific time offsets may be set forth in the base station almanac. The mobile station may also take into account transmission delays caused by repeaters.

The mobile station calculates an expected phase for the target pilot signal at the mobile station, as indicated by block 112. More particularly, the mobile station may calculate the expected phase as the nominal phase of the target pilot signal, adjusted for the transmission delay that the mobile station estimated for the target pilot signal.

The mobile station may also include other corrections when calculating the expected phase. For example, as noted above, the mobile station's time may differ from the system's time due to the transmission delay in the synchronization signal that the mobile station used to set its time. Thus, when calculating the expected phase, the mobile station may correct for the transmission delay associated with the synchronization signal. To do this, the mobile station may obtain the location of the source transmitter (e.g., by consulting the base station almanac) and obtain an estimate of its location at the time that the mobile station set its time based on the synchronization signal. The mobile station may then calculate the transmission delay as the time required for the synchronization signal to propagate from the source transmitter's location to the mobile station's location.

Once the mobile station has calculated the expected phase for the target pilot signal, the mobile station may search for the target pilot signal by searching for a pilot signal having a phase at the mobile station that is within a predefined range of the expected phase, as indicated by block 114. The predefined range may be based on a search window size parameter that the mobile station received from the spread spectrum communication system. For example, in the case of IS-95 CDMA, the mobile station may receive a "SRCH_WIN_A" parameter that defines the search window size for the active and candidate sets, a "SRCH_WIN_N" parameter that defines the search window size for the neighbor set, and a "SRCH_WIN_R" search window that defines the search window size for the remaining set.

The mobile station may set the predefined range used to search for the target pilot signal as half the width specified by one of these search window size parameters. Thus, the mobile station may use a search window to search for the target pilot signal that has a width corresponding to a search window size parameter specified by the system but which is centered on the expected phase of the target pilot signal as calculated by the mobile station. In this way, the mobile station may find the target pilot signal by searching within the search window.

4. Exemplary Mobile Station

Figure 3:
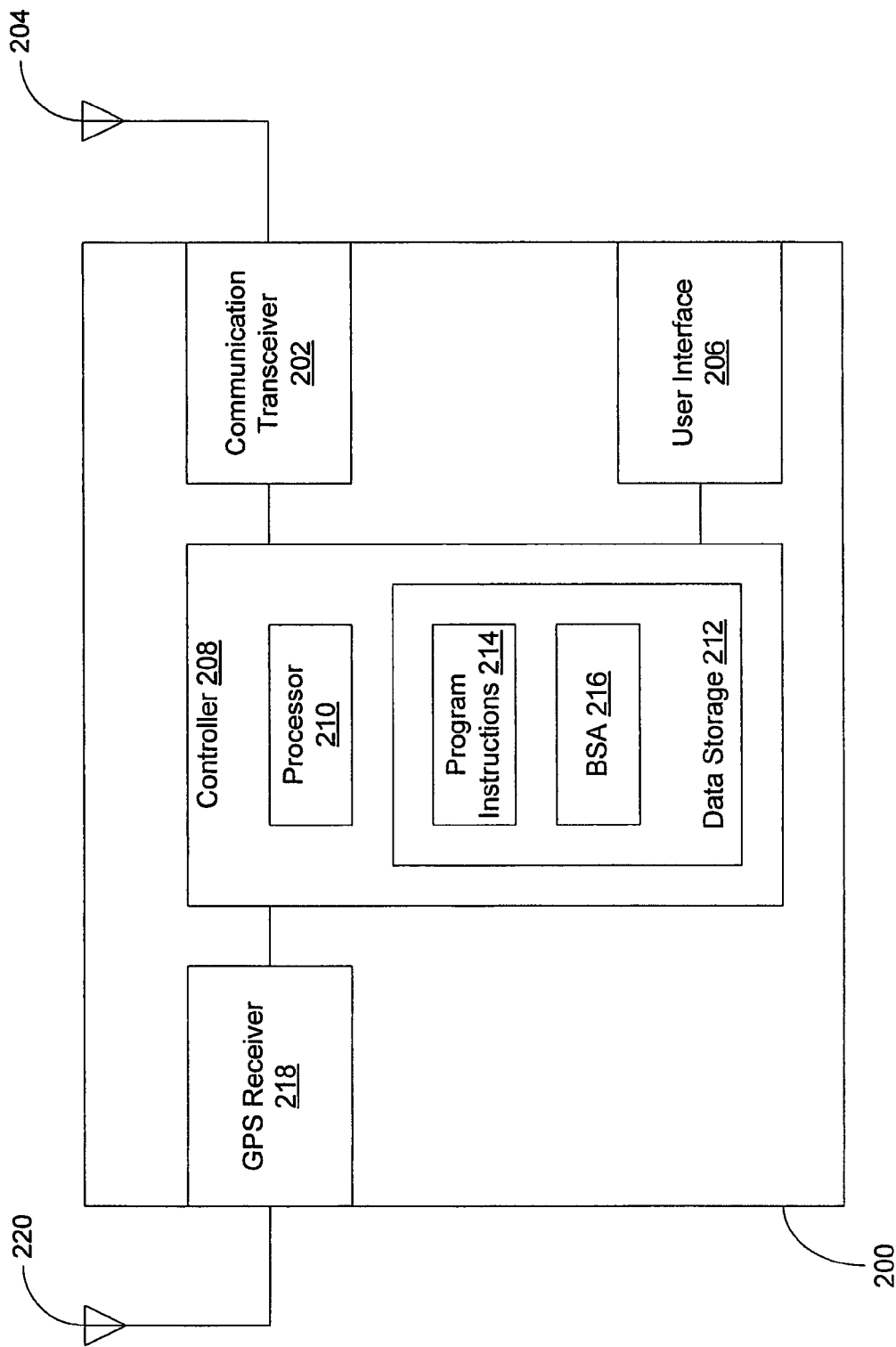
FIG. 3 is a block diagram of a mobile station, in accordance with an exemplary embodiment.

FIG. 3 illustrates an exemplary mobile station 200 that can operate in accordance with the flowchart of FIG. 2. Mobile Station 200 includes a communication transceiver 202 for communicating with one or more sectors in a spread spectrum communication system (e.g., system 10 in FIG. 1) via an antenna 204. More particularly, communication transceiver 202 may function as a transmitter for transmitting spread spectrum signals to one or more sectors and may function as a receiver for receiving spread spectrum signals transmitted by one or more sectors.

Mobile station 200 also includes a user interface 206 for obtaining input from a user of mobile station 200 and for conveying information to user. Thus, user interface 206 may include a keypad, touch screen, or other controls by which the user may provide input into mobile station 200. User interface 206 may also include a display for displaying textual, graphical, or other visual information to the user. Mobile station 200 may also be configured for voice communication. Thus, user interface 206 may include a microphone for receiving audio input from the user and a speaker for conveying audio to the user. Alternatively, mobile station 200 may communicate with an external microphone and/or speaker, for example, via a wireless connection.

The functioning of mobile station 200 may be controlled by a controller 208 coupled to communication transceiver 202 and to user interface 206. Controller 208 may comprise a processor 210 and data storage 212. Data storage 212 may include volatile and/or non-volatile memory. Data storage 212 may store program instructions 214 that are executable by processor 210 to control the functioning of mobile station 200. Data storage 212 may also store other information, such as a base station almanac (BSA) 216.

Program instructions 214 may be executable by processor 210 so as to cause mobile station 200 to perform the functions illustrated in FIG. 2 and described above. Thus, program instructions 214 may be executable to perform the steps of: (a) estimating a target-transmitter transmission delay based on at least a target transmitter location of a target transmitter in the spread spectrum communication system; (b) calculating an expected phase at mobile station 200 (i.e., as received by communication transceiver 202) of a target spread spectrum signal transmitted by the target transmitter, based on at least a nominal phase of the spread spectrum signal and the target-transmitter transmission delay; and (c) controlling communication transceiver 202 based on the expected phase (e.g., controlling communication transceiver 202 to search for a spread spectrum signal having a phase at the mobile station that is within a predefined range of the expected phase).

Mobile station 200 may also be able to determine its location, for example, based on signals received from a satellite-based positioning system. Thus, mobile station may include a GPS receiver 218 for receiving GPS signals via an antenna 220. GPS receiver 218 may be coupled to controller 208. Program instructions 214 may be executable by processor 210 to obtain an estimate of the location of mobile station 200 based on GPS signals received by GPS receiver 218 (a process that may also involve communicating with a position determining entity or other entity in the spread spectrum communication system) and to use this location of mobile station 200 to estimate the target-transmitter transmission delay (the location of the target transmitter may be obtained from BSA 216).

Program instructions 214 may also be executable by processor 210 to take into account a difference between the time kept by mobile station 200 and the time kept by the spread spectrum communication system. Thus, program instructions 214 may be executable to perform the steps of: (d) developing a mobile station time based on a synchronization signal received by communication transceiver 202 from a source transmitter in the spread spectrum communication system (whereby the mobile station time differs from a system time by a source-transmitter transmission delay); (e) determining a source transmitter location of the source transmitter (e.g., by referring to BSA 216); and (f) estimating the source-transmitter transmission delay based on at least the source transmitter location and the location of mobile station 200. The calculation of the expected phase may then correct for this source-transmitter transmission delay.

5. Conclusion

Exemplary embodiments of the present invention have been described above. Those skilled in the art will understand, however, that changes and modifications may be made to these embodiments without departing from the true scope and spirit of the invention, which is defined by the claims.

What is claimed is:

1. A method of searching for a target spread spectrum signal for a mobile station, said target spread spectrum signal having a nominal phase, said method comprising:
   said mobile station receiving a base station almanac, wherein said base station almanac identifies locations of a plurality of transmitters in a spread spectrum communication system;
   said mobile station receiving a synchronization signal from a source transmitter, said synchronization signal providing information regarding a system time used by said spread spectrum communication system;
   said mobile station developing a mobile station time based on said synchronization signal, wherein said mobile station time differs from said system time by a source-transmitter transmission delay;
   estimating said source-transmitter transmission delay;
   said mobile station obtaining a target transmitter location of a target transmitter from said base station almanac, wherein said target transmitter transmits said target spread spectrum signal;
   estimating a mobile station location of said mobile station;
   estimating a target-transmitter transmission delay based on at least said target transmitter location and said mobile station location;
   calculating an expected phase of said target spread spectrum signal at said mobile station based on at least said nominal phase, said source-transmitter transmission delay, and said target-transmitter transmission delay; and
   said mobile station searching for a spread spectrum signal having a phase at said mobile station that is within a predefined range of said expected phase.

2. The method of claim 1, wherein said target spread spectrum signal is a pilot signal.

3. The method of claim 2, wherein said pilot signal is spread by a pseudonoise (PN) sequence, and wherein said nominal phase is a time offset of said PN sequence according to a system time used by said spread spectrum communication system.

4. The method of claim 1, wherein estimating a mobile station location of said mobile station comprises:
   using a satellite-based positioning system.

5. The method of claim 1, wherein said target transmitter is in a base transceiver station (BTS).

6. The method of claim 1, wherein said predefined range is defined by a search window.

7. The method of claim 6, further comprising:
   said mobile station receiving a search window size parameter;
   said mobile station defining said search window such that said search window is centered on said expected phase and has a width corresponding to said search window size parameter.

8. The method of claim 1, further comprising:
   said mobile station obtaining a source transmitter location of said source transmitter from said base station almanac; and
   wherein estimating said source-transmitter transmission delay comprises estimating said source-transmitter transmission delay based on at least said source transmitter location and a location of said mobile station when said mobile station developed said mobile station time based on said synchronization signal.

9. The method of claim 1, further comprising:
   said mobile station receiving a neighbor list that identifies said target spread spectrum signal by said nominal phase.

10. The method of claim 1, wherein said mobile station receives said base station almanac from said source transmitter.

11. A mobile station, comprising:
    a communication receiver for receiving spread spectrum signals;
    a processor;
    data storage; and
    a plurality of program instructions stored in said data storage and executable by said processor to perform functions comprising:
    (a) receiving a base station almanac, wherein said base station almanac identifies locations of a plurality of transmitters in a spread spectrum communication system;
    (b) obtaining a target transmitter location of a target transmitter from said base station almanac;
    (c) estimating a target-transmitter transmission delay based on at least said target transmitter location and a mobile station location of said mobile station;
    (d) developing a mobile station time based on a synchronization signal received from a source transmitter in said spread spectrum communication system, wherein said mobile station time differs from a system time by a source-transmitter transmission delay;
    (e) estimating said source-transmitter transmission delay;
    (f) calculating an expected phase at said mobile station of a target spread spectrum signal transmitted by said target transmitter, wherein said expected phase is calculated based on at least a nominal phase of said target spread spectrum signal, said source-transmitter transmission delay, and said target-transmitter transmission delay; and (g) controlling said communication receiver based on said expected phase.

12. The mobile station of claim 11, wherein controlling said communication receiver based on said expected phase comprises:

controlling said communication receiver to search for a spread spectrum signal having a phase at said mobile station that is within a predefined range of said expected phase.

13. The mobile station of claim 11, further comprising:

a positioning receiver for receiving signals from a satellite-based positioning system, wherein said mobile station obtains said mobile station location using said positioning receiver.

14. The mobile station of claim 11, wherein estimating said source-transmitter transmission delay comprises:

obtaining a source transmitter location of said source transmitter from said base station almanac; and estimating said source-transmitter transmission delay based on at least said source transmitter location and a location of said mobile station when said mobile station developed said mobile station time based on said synchronization signal.

* * * * *